United States Patent
Suzuki

(10) Patent No.: US 11,759,867 B2
(45) Date of Patent: Sep. 19, 2023

(54) CUTTING INSERT AND CUTTING TOOL

(71) Applicant: TUNGALOY CORPORATION, Fukushima (JP)

(72) Inventor: Yusuke Suzuki, Iwaki (JP)

(73) Assignee: TUNGALOY CORPORATION, Fukushima (JP)

(*) Notice: Subject to any disclaimer, the term of this patent is extended or adjusted under 35 U.S.C. 154(b) by 0 days.

(21) Appl. No.: 17/685,826

(22) Filed: Mar. 3, 2022

(65) Prior Publication Data
US 2022/0331883 A1     Oct. 20, 2022

(30) Foreign Application Priority Data
Apr. 15, 2021   (JP) .................... 2021-068761

(51) Int. Cl.
*B23B 29/04*   (2006.01)
*B23B 27/16*   (2006.01)
(Continued)

(52) U.S. Cl.
CPC ........ *B23B 29/043* (2013.01); *B23B 27/1614* (2013.01); *B23B 27/04* (2013.01);
(Continued)

(58) Field of Classification Search
CPC .............. B23B 29/043; B23B 27/1614; B23B 2200/048; B23B 2200/085; B23B 2200/3627; B23B 2205/12; B23B 27/04; B23B 2200/121; B23B 2200/161; B23B 2200/369; B23B 27/1622; B23B 27/00; B23B 2200/0423; B23B 2200/08; B23B 2200/16
See application file for complete search history.

(56) References Cited

U.S. PATENT DOCUMENTS 5,032,050 A * 7/1991 Niebauer .............. B23B 27/045
                                                          407/117
7,597,508 B2 * 10/2009 Hecht ................. B23B 27/1622
                                                          407/103
(Continued)

FOREIGN PATENT DOCUMENTS

EP       1657012 A1    5/2006
EP       2285513 A1    2/2011
(Continued)

*Primary Examiner* — Sara Addisu
(74) *Attorney, Agent, or Firm* — Studebaker & Brackett PC

(57) ABSTRACT

A cutting insert and a cutting tool which can suppress lowering of blade-edge positional accuracy while holding by a holder having a small thickness is enabled are provided. The cutting insert includes a first end surface, a second end surface, and a peripheral side surface connected to the first end surface and the second end surface and having a rake face, a flank, and a cutting edge formed in a connection region between the rake face and the flank, and a through hole penetrating the first end surface and the second end surface is formed. It is the cutting insert including a first contact surface substantially perpendicular to a center axis direction of the through hole and capable of contacting the holder, a second contact surface substantially in parallel with the center axis direction of the through hole, substantially perpendicular to a plane including the first contact surface and capable of contacting the holder, and a third contact surface inclined with respect to the center axis direction of the through hole and capable of contacting the holder, and a cutting tool including the cutting insert as above.

8 Claims, 10 Drawing Sheets

(51) Int. Cl.
*B23B 27/08* (2006.01)
*B23B 27/04* (2006.01)

(52) U.S. Cl.
CPC ... *B23B 2200/048* (2013.01); *B23B 2200/085* (2013.01); *B23B 2200/121* (2013.01); *B23B 2200/161* (2013.01); *B23B 2200/3627* (2013.01); *B23B 2205/12* (2013.01)

(56) References Cited

U.S. PATENT DOCUMENTS

| | | | |
|---|---|---|---|
| 7,645,100 B2 * | 1/2010 | Andersson | B23B 27/065 |
| | | | 407/66 |
| 9,120,156 B2 * | 9/2015 | Hecht | B23B 27/1651 |
| 9,421,614 B2 * | 8/2016 | Morgulis | B23B 27/1651 |
| 9,981,330 B2 * | 5/2018 | Sjoo | B23F 21/066 |
| 10,201,855 B2 * | 2/2019 | Ida | B23B 27/04 |
| 11,491,550 B2 * | 11/2022 | Ida | B23B 27/1614 |
| 2008/0152440 A1 | 6/2008 | Andersson et al. | |
| 2009/0162154 A1 | 6/2009 | Jonsson et al. | |
| 2011/0110733 A1 | 5/2011 | Hecht | |
| 2012/0099935 A1 | 4/2012 | Hecht | |

FOREIGN PATENT DOCUMENTS

| | | |
|---|---|---|
| JP | 2003-503218 A | 1/2003 |
| JP | 2008-155366 A | 7/2008 |
| JP | 2013-510011 A | 3/2013 |
| JP | 2013-540058 A | 10/2013 |
| WO | 2009/138975 A1 | 11/2009 |

* cited by examiner

CUTTING INSERT AND CUTTING TOOL

BACKGROUND

Field

The present invention relates to a cutting insert and a cutting tool.

Description of Related Art

A cutting tool used as a cutting tool for lathe turning, grooving, cutting off, thread cutting and the like is known. These cutting tools include a replaceable cutting insert and a holder for holding such cutting insert. Here, if the size of the cutting insert is made smaller, a force to hold the cutting insert is lowered. Thus, an art for improving the holding force for the cutting insert is known.

Japanese Translation of PCT Application No. 2003-503218 describes a cutting tool which enables improvement of holding strength between the cutting insert and the holder. According to this cutting tool, a groove is formed in the holder and the cutting insert, and by bringing the grooves into contact with each other by tightening of a screw, a force in a direction orthogonal to a center axis of the screw can be generated. Thus, the cutting insert can be firmly held by pressing the cutting insert against the holder in a direction orthogonal to the center axis of the screw.

Japanese Translation of PCT Application No. 2013-540058 describes a cutting insert which has four cutting edges and four contact surfaces. According to this cutting tool, when cutting is to be performed by using one cutting edge, by bringing three contact surfaces of the four contact surfaces into contact with the holder, the cutting insert can be firmly held by the holder.

SUMMARY

However, since the cutting insert described in Japanese Translation of PCT Application No. 2003-503218 has the groove formed in a screw-tightening direction, it is difficult to improve positional accuracy of a blade edge in the screw-tightening direction. Therefore, in order to maintain the blade-edge positional accuracy, shape accuracy of the cutting insert should be improved.

Moreover, the cutting insert described in Japanese Translation of PCT Application No. 2003-503218 has a contact surface for restricting the cutting insert to a periphery of the blade edge. Therefore, if one of the cutting edges of the cutting insert having a plurality of the cutting edges is damaged, the contact surface around the cutting edge also becomes defective and thus, even use of the other cutting edge becomes difficult.

In addition, the cutting inserts described in Japanese Translation of PCT Application No. 2003-503218 and Japanese Translation of PCT Application No. 2013-540058 need to be held by a holder having a thickness larger than that in a shorter-side direction of the cutting insert so that a peripheral side surface of the cutting insert is supported. Therefore, such a need to use a plurality of cutting inserts with different sizes in accordance with the thickness of the holder occurs.

Therefore, the present invention has an object to provide a cutting insert and a cutting tool which enable use of a cutting edge even if the cutting edge is damaged, enable holding by a holder having a small thickness or enable suppression on lowering of the blade-edge positional accuracy.

This application discloses a cutting insert. This cutting insert is a vertical-type cutting insert, including a first end surface, a second end surface, and a peripheral side surface connected to the first end surface and the second end surface and having a rake face, a flank, and a cutting edge formed in a connection region between the rake face and the flank, and having a through hole penetrating the first end surface and the second end surface formed, in which a first contact surface substantially perpendicular to a center axis direction of the through hole and capable of contacting a holder; a second contact surface substantially in parallel with the center axis direction of the through hole and substantially perpendicular to a plane including the first contact surface and capable of contacting the holder; and a third contact surface inclined with respect to the center axis direction of the through hole and capable of contacting the holder are provided.

It may be so configured that the cutting insert includes a first end portion corresponding to one end side in the center axis direction of the through hole and in which the first end surface is provided, and a second end portion corresponding to the other end side in the center axis direction of the through hole and in which the second end surface is provided, in which the second end portion includes a protruding portion protruding in a direction separated from the first end surface, and the third contact surface is provided on an inclined surface of the protruding portion.

It may be so configured that the second end portion includes at least two pieces of the protruding portions, and on the inclined surface of one of the protruding portions, one of the third contact surfaces is formed, while on the inclined surface of the other protrudin portion, the other third contact surface opposed to the one third contact surface is formed.

The one third contact surface and the other third contact surface may be formed symmetrically with respect to a first virtual plane passing through the center axis of the through hole and orthogonal to a first direction corresponding to a longitudinal direction of the cutting insert.

The one protruding portion and the other protruding portion may be formed symmetrically with respect to a second virtual plane passing through the center axis of the through hole and orthogonal to a second direction corresponding to a shorter-side direction of the cutting insert, respectively.

However, the first direction and the second direction are orthogonal to the center axis of the through hole, and the first direction and the second direction are orthogonal to each other.

It may be so configured that the one third contact surface is formed so that a distance from the first virtual plane becomes larger as it advances in a direction separated from the center axis in the second direction, while the other third contact surface is formed so that the distance from the first virtual plane becomes larger as it advances in the direction separated from the center axis in the second direction.

It may be so configured that the cutting insert includes a peripheral side surface portion connected to the first end portion and the second end portion and on which the peripheral side surface is provided, and the peripheral side surface portion includes at least two extension portions protruding in a direction separated from the second virtual plane. It may be so configured that the peripheral side surface may include at least two pieces of the second contact surfaces, and the one second contact surface is provided on the surface of the one extension portion, while the other second contact surface is provided on the surface of the other extension portion.

It may be so configured that the cutting edge is formed on a distal end portion in a first direction corresponding to a longitudinal direction of the cutting insert, the one second contact surface is formed in a region on a distal end side where the cutting edge is present with the center axis as a boundary in the first direction and region on a lower end side where the cutting edge is not present with the center axis as the boundary in a second direction corresponding to a shorter-side direction of the cutting insert, the other second contact surface is formed in a region on a base end side where the cutting edge is not present with the center axis as the boundary in the first direction and region on the lower end side, a first piece of the third contact surface is formed in a region on the base end side and region on an upper end side where the cutting edge is present with the center axis as a reference in the second direction, a second piece of the third contact surface is formed in a region on the base end side and region on the lower end side, a third piece of the third contact surface is formed in a region on the distal end side and region on the lower end side, and a fourth piece of the third contact surface is formed in a region on the distal end side and region on the upper end side.

It may be formed 180-degree rotational-symmetrically with the center axis of the through hole as the reference.

This application discloses any one of the cutting inserts described above and a cutting tool including a holder for holding this cutting insert. Here, the holder may include a seat surface in contact with the first contact surface of the cutting insert and a wall surface in contact with the one second contact surface, the other second contact surface, and the first piece of the third contact surface of the cutting insert, respectively.

This application discloses any one of the cutting inserts described above and a cutting tool including a holder for holding this cutting insert. Here, the holder may be a holder different from the aforementioned holder. The holder may include a seat surface in contact with the first contact surface of the cutting insert and a wall surface in contact with the first piece of the third contact surface, the second piece of the third contact surface, and the third piece of the third contact surface of the cutting insert, respectively.

DETAILED DESCRIPTION

Hereinafter, an embodiment of the present invention will be described by using figures. The following embodiment is exemplification for explaining the present invention and is not intended to limit the present invention only to the embodiment.

Figure 1:
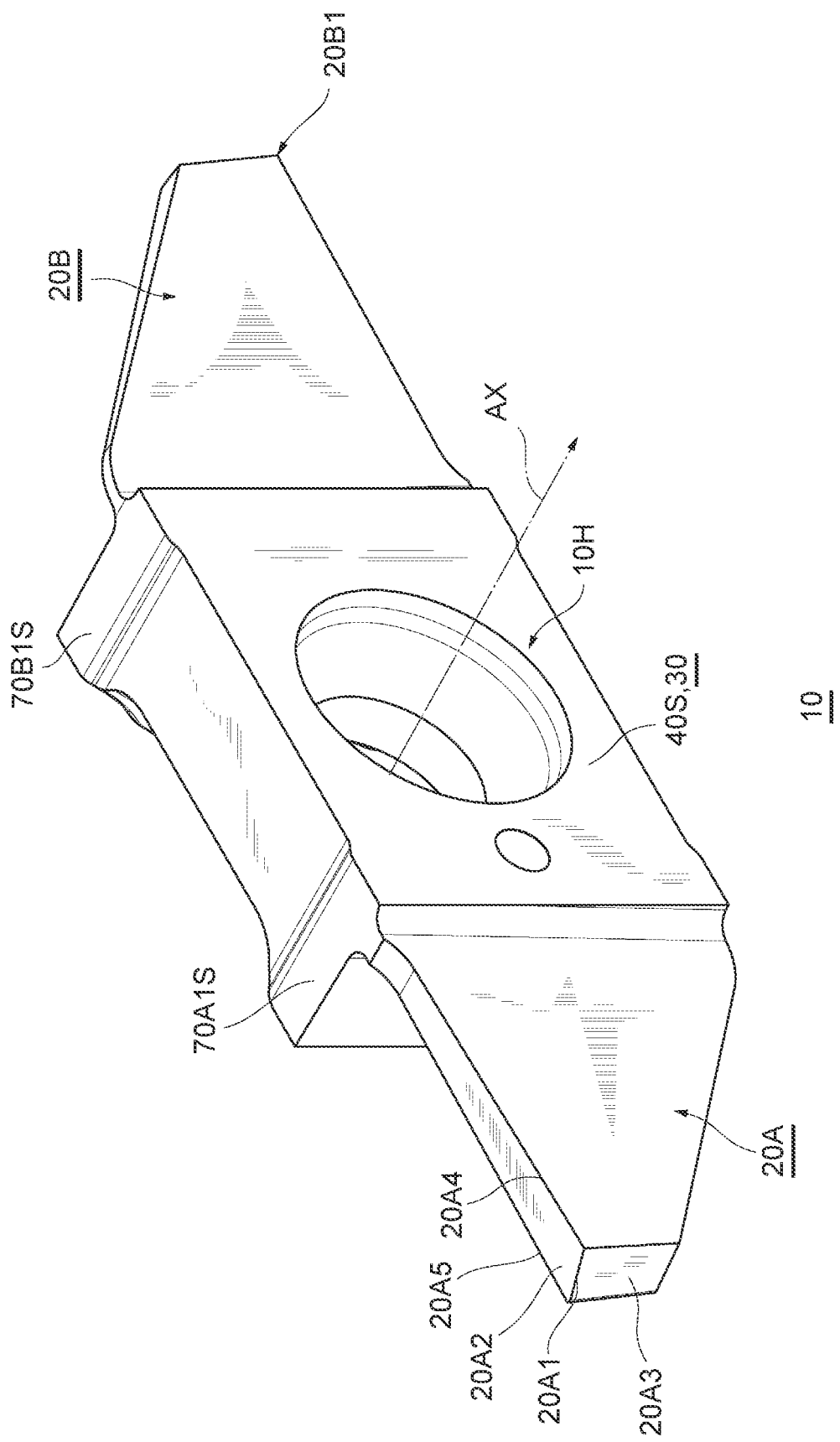
FIG. 1 is a perspective view of a cutting insert according to an embodiment.
Figure 2A:
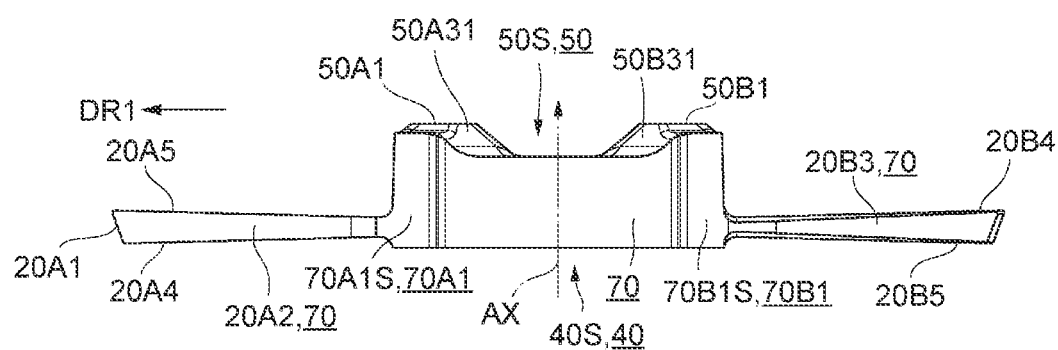
FIGS. 2A, 2B, 2C, and 2D are a plan view, a front view, a rear view, and a right side view of the cutting insert according to the embodiment.
Figure 2B:
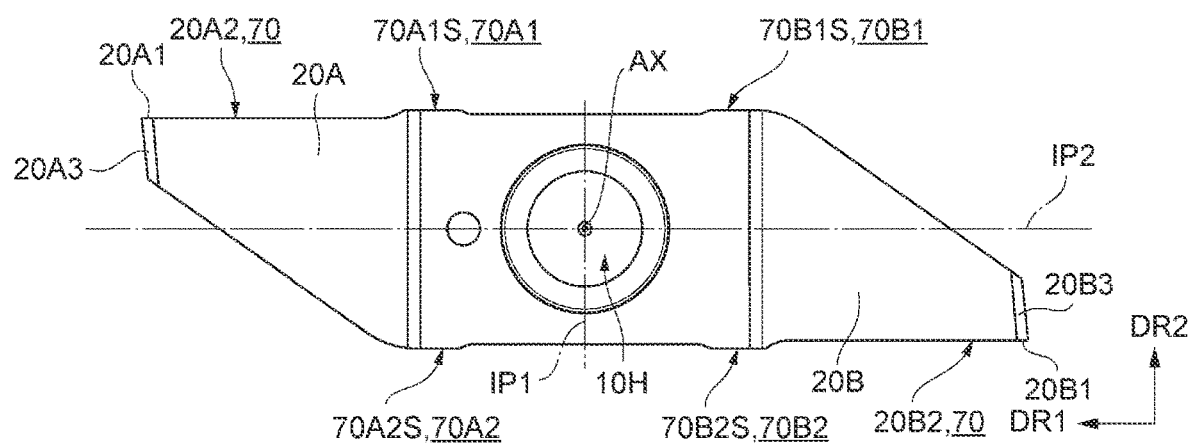
Figure 2C:
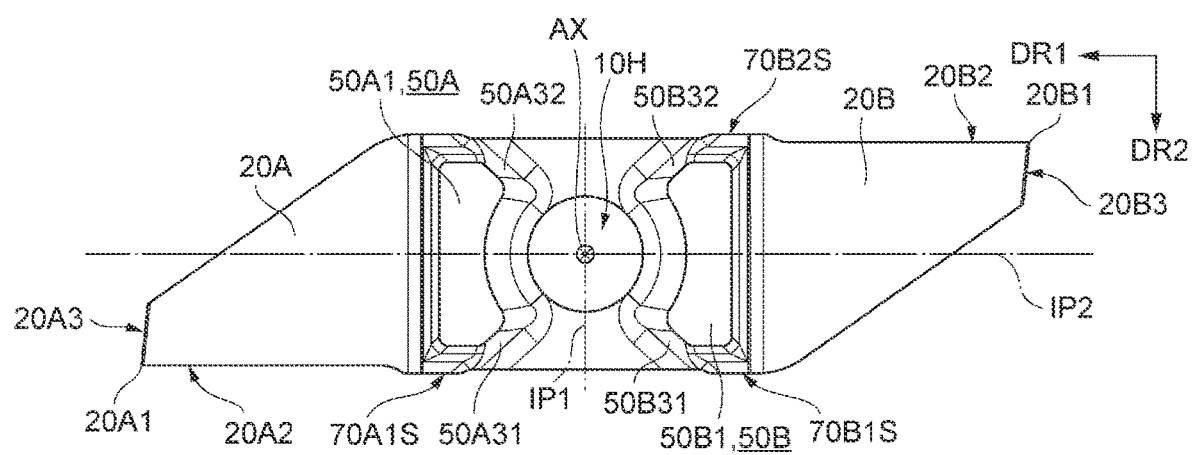
Figure 2D:
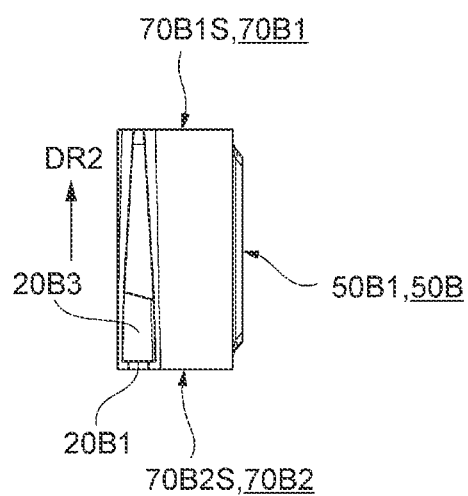
Figure 3:
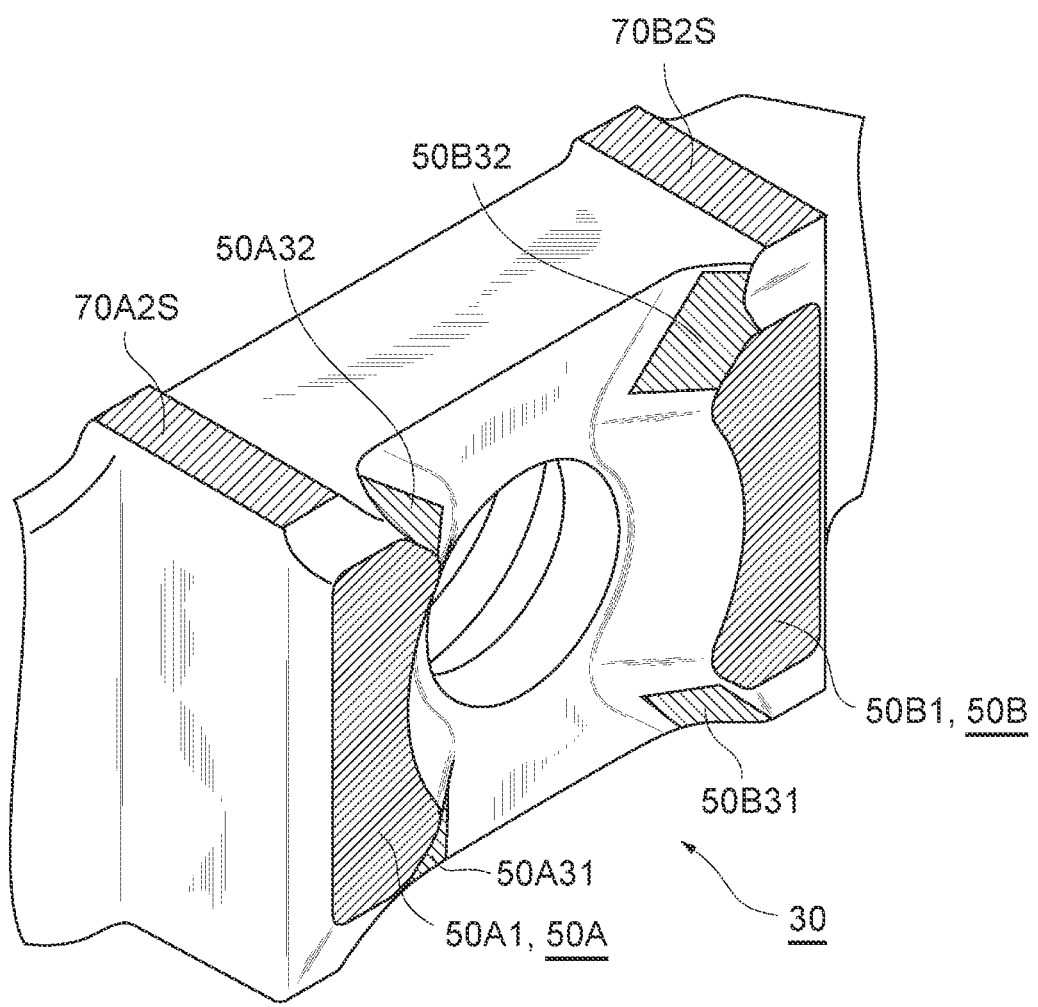
FIG. 3 is an enlarged perspective view of a clamp portion of the cutting insert according to the present invention.

FIG. 1 is a perspective view of a cutting insert 10 according to this embodiment, FIGS. 2A, 2B, 2C, and 2D are a plan view, a front view, a rear view, and a right side view of the cutting insert 10, respectively, and FIG. 3 is an enlarged perspective view of a part including a second end surface 50S of the cutting insert 10.

The cutting insert 10 according to this embodiment is a cutting insert for cutting-off which removes an unnecessary part of a workpiece and splits the workpiece by pressing a cutting edge against a rotating workpiece in a radial direction (a direction orthogonal to a rotating axis of the workpiece) as an example. However, the present invention is not limited to that but can be widely applied to a cutting insert for lathe turning for cutting an outer diameter of the workpiece by pressing the cutting edge in a direction in parallel with the rotating axis of the workpiece and other cutting inserts and cutting tools, for example. For example, the present invention may be applied not only to the cutting insert and the cutting tool for lathe turning but also to a cutting insert and a cutting tool for rotating cutting capable of trepanning and the like.

As shown in these figures, the cutting insert 10 has a first end surface 40S, a second end surface 50S, and a peripheral side surface 70S connected to the first end surface 40S and the second end surface 50S. In the cutting insert 10, a through hole 10H penetrating the first end surface 40S and the second end surface 50S is formed.

As shown in FIG. 2B, the cutting insert 10 is formed having a parallelogram shape on a plan view (top view). Hereinafter, a longitudinal direction of the cutting insert 10 on the plan view is called a first direction DR1, and a short side direction is called a second direction DR2 in some cases. Moreover, in the first direction DR1, a direction where a first cutting edge 20A1 is formed is called a first direction DR1 front, a direction where a second cutting edge 20B1 is formed as a first direction DR1 rear, and in the second direction DR2, a direction where the first cutting edge 20A1 is formed as a second direction DR2 upward, and a direction where the second cutting edge 20B1 is formed as a second direction DR2 downward in some cases. The first direction DR1 is orthogonal to the second direction DR2 and a center axis AX direction of the through hole 10H, and the second direction DR2 is orthogonal to the first direction DR1 and the center axis AX direction. Furthermore, in the center axis AX direction of the through hole 10H, a direction where the first end surface 40S is formed is called a center axis AX direction outward, and a direction where the second end surface 50S is formed as a center axis AX direction inward in some cases.

The cutting insert 10 is a cutting insert having a dimension of 30 mm or less in the first direction DR1, 10 mm or less in the second direction DR2, and 5 mm or less in the center axis AX direction, for example. As will be described later, the cutting insert 10 is constituted capable of being held by a holder of an ordinary size or a small-sized holder.

As shown in the same figure, the cutting insert 10 is formed 180-degree rotational-symmetrically with the center axis AX as a reference on a plan view (top view). Hereinafter, a part corresponding to a center of the cutting insert 10 in the first direction DR1 is called a clamp portion 30, a part on a distal end side in the first direction DR1 front with respect to the clamp portion 30 as a first cutting portion 20A, and a part on a base end side in the first direction DR1 rear with respect to the clamp portion 30 as a second cutting portion 20B.

The clamp portion 30 (holding portion) is a portion where the cutting insert 10 is held by a holder which will be described later.

The first cutting portion 20A is a portion for cutting a workpiece. The first cutting portion 20A is provided on the first direction DR1 front side with respect to the clamp portion 30, and on an end portion (close to a sharp-angle apex of the parallelogram) in the first direction DR1 front thereof, the first cutting edge 20A1 which is a front cutting edge is formed.

The second cutting portion 20B is a portion for cutting a workpiece. The second cutting portion 20B is provided on the first direction DR1 rear side, which is a side opposite to the first cutting portion 20A, with respect to the clamp portion 30, and on an end portion (close to the sharp-angle apex of the parallelogram) in the first direction DR1 rear thereof, the second cutting edge 20B1 which is a front cutting edge is formed.

Since the cutting insert 10 is formed 180-degree rotational-symmetrically with the center axis AX as the reference, by rotating the cutting insert 10 by 180 degrees after abrasion of the first cutting edge 20A1, the second cutting edge 20B1 can be used. Moreover, since the cutting insert 10 is held in the holder by the clamp portion 30, it is configured such that, even if the cutting edge of the one of the cutting portions is damaged, the cutting edge of the other cutting portion can be used.

Hereinafter, a constitution of the clamp portion 30 will be described in detail.

As described above, the clamp portion 30 is a portion for being held by the holder and includes the first end surface 40S, the second end surface 50S, and a part of the peripheral side surface 70S. As will be described later, by inserting a male screw into the through hole 10H from the first end surface 40S, by screwing it with a female thread formed in the holder and pressing the first end surface 40S with a head part of the male screw, and by pressing the second end surface 50S against the holder, the cutting insert 10 can be held by the holder.

As shown in FIG. 2A, the clamp portion 30 includes a first end portion 40 corresponding to one end side on the center axis AX direction outward side, a second end portion 50 corresponding to the other end side of the center axis AX direction inward side, and a peripheral side surface portion 70 connecting the first end portion 40 and the second end portion 50.

On a surface of the first end portion 40, the first end surface 40S is provided. The first end surface 40S is a surface substantially perpendicular to the center axis AX direction and has a surface pressed by the head part of the male screw.

On a surface of the second end portion 50, the second end surface 50S is provided. The second end portion 50 includes a bottom surface 50G of a groove portion provided by being dented in a direction getting closer to the first end surface 40S and two protruding portions, that is, a protruding portion 50A and a protruding portion 50B provided by protruding in a direction separated from the first end surface 40S.

The bottom surface 50G of the groove portion is provided by extending in the second direction DR2 at the center part of the clamp portion 30 in the first direction DR1 by being sandwiched by the two protruding portions, that is, the protruding portion 50A and the protruding portion 50B. The bottom surface 50G corresponds to a surface provided at a position which is the closest to the first end surface 40S in the second end surface 50S. The bottom surface 50G is provided substantially perpendicularly to the center axis AX direction. At the center part in the second direction DR2 of the bottom surface 50G, the through hole 10H is formed. As shown in FIG. 2C, a groove width in the first direction DR1 of the bottom surface 50G in this embodiment is the widest at both ends in the second direction DR2 connected to the peripheral side surface 70S, gradually becomes narrower as it is separated from the peripheral side surface 70S and gets closer to the through hole 10H and then, is connected to the through hole 10H.

As shown in the same figure, the protruding portion 50A has a reference surface 50A1 (one example of the "first contact surface"), two inclined surfaces, that is, an inclined surface 50A31 (one example of the "third contact surface"), and an inclined surface 50A32 (one example of the "third contact surface"). The protruding portion 50A is provided in the first direction DR1 front with respect to the groove portion.

The reference surface 50A1 is a surface corresponding to a top surface of the protruding portion 50A and corresponds to a surface provided at a position which is the most separated from the first end surface 40S in the center axis AX direction in the second end surface 50S and in the surfaces of the cutting insert 10. The reference surface 50A1 is provided substantially perpendicularly to the center axis AX direction and thus, by bringing the reference surface 50A1 into contact with the holder, the cutting insert 10 can be positioned in the center axis AX direction with accuracy. Moreover, since the reference surface 50A1 according to this embodiment is formed larger than a diameter of the through hole 10H in the second direction DR2, it can be stably held in the holder. Furthermore, the reference surface 50A1 is provided symmetrically to a second virtual plane IP2 which passes through the center axis AX, is in parallel with the first direction DR1 and is perpendicular to the second direction DR2. This configuration also contributes to the stable holding in the holder.

The inclined surface 50A31 and the inclined surface 50A32 are side surfaces of the protruding portion 50A and are provided between the reference surface 50A1 and the bottom surface 50G of the groove portion.

The inclined surface 50A31 is provided at a position corresponding to the first direction DR1 front with respect to the center axis AX and the second direction DR2 upward on an end-surface view (rear view, FIG. 2C) when seen from a direction opposed to the second end surface 50S. The inclined surface 50A31 is provided so that a normal line is directed to a direction in the first direction DR1 rear and toward the second direction DR2 upward and is directed to the center axis AX direction inward on a side view when seen from a direction perpendicular to the center axis AX. That is, the inclined surface 50A31 is provided so that the normal line of the inclined surface 50A31 is inclined with respect to the center axis AX both on the rear view when seen from the direction in parallel with the center axis AX direction and on the side view when seen from the direction perpendicular to the center axis AX direction.

In order to maintain such a normal line, the inclined surface 50A31 is formed so that the distance from a first virtual plane IP1 becomes larger as it advances in a direction separated from the center axis AX1 in the second direction DR2 upward on the end surface view (FIG. 2C). However, the inclined surface 50A31 may be a plane or a curved surface.

The protruding portion 50A is formed symmetrically to the second virtual plane IP2. Thus, the inclined surface 50A32 is provided at a position corresponding to the first direction DR1 front with respect to the center axis AX and the second direction DR2 downward on the end surface view (rear view, FIG. 2C) when seen from a direction opposed to the second end surface 50S. The inclined surface 50A32 is provided so that the normal line is directed to a direction in the first direction DR1 rear and toward the second direction DR2 downward and is directed to the center axis AX direction inward on the side view when seen from the direction opposed to the peripheral side surface 70S. That is, the inclined surface 50A32 is provided so that the normal line of the inclined surface 50A32 is inclined with respect to the center axis AX both on the rear view when seen from the direction in parallel with the center axis AX direction and on the side view when seen from the direction perpendicular to the center axis AX direction.

The protruding portion 50B includes a reference surface 50B1 (one example of the "first contact surface"), two inclined surfaces, that is, an inclined surface 50B31 (one example of the "third contact surface"), and an inclined surface 50B32 (one example of the "third contact surface"). The protruding portion 50B is provided in the first direction DR1 rear with respect to the bottom surface 50G of the groove portion. Since the protruding portion 50B is formed symmetrically to the protruding portion 50A with respect to the first virtual plane IP1 passing through the center axis AX, perpendicular to the first direction DR1, and in parallel with the second direction DR2, detailed explanation will be omitted by replacing the explanation on the aforementioned protruding portion 50A as appropriate with the explanation on the reference surface 50B1, the inclined surface 50B31, and the inclined surface 50B32. That is, the inclined surface 50B31 is formed so that the normal line is directed to the first direction DR1 front, the second direction DR2 upward, and the center axis AX direction inward, the inclined surface 50B32 is formed so that the normal line is directed to the first direction DR1 front, the second direction DR2 downward, and the center axis AX direction inward. Moreover, the inclined surface 50B31 and the inclined surface 50B32 are formed symmetrically to the inclined surface 50A31 and the inclined surface 50A32 with respect to the first virtual plane IP1, respectively. Thus, the inclined surface 50A31 (inclined surface 50A32) and the inclined surface 50B31 (inclined surface 50B32) are formed symmetrically by opposing each other via the first virtual plane IP1 and they are formed so that a distance from the first virtual plane IP1 becomes larger as it advances in the direction separated from the center axis AX in the second direction DR2 upward (downward), respectively, on the end surface view. Thus, the distance between the inclined surface 50A31 (inclined surface 50A32) and the inclined surface 50B31 (inclined surface 50B32) becomes larger as they advance in the direction separated from the center axis AX in the second direction DR2 upward (downward) and becomes larger as they advance in the center axis AX direction outward away from the bottom surface 50G of the groove portion.

By expressing the aforementioned configuration in other words, the four inclined surfaces, that is, the inclined surface 50A31, the inclined surface 50A32, the inclined surface 50B31, and the inclined surface 50B32 provided on the second end surface 50S are all provided such that the normal lines thereof get closer to the first virtual plane IP1, are separated from the second virtual plane IP2, and are directed to the direction separated from the first end surface 40S and also provided inside the peripheral side surface 70S on the end surface view (rear view, FIG. 2C) when seen from the direction opposed to the second end surface 50S.

On the rear view (FIG. 2C) when seen from the direction opposed to the second end surface 50S, a straight line approximating an extending direction of the inclined surface 50A31 does not pass through the center axis AX and has an open angle of 40 to 60 degrees with respect to the first virtual plane IP1, for example, and when being cut on a section perpendicular to this straight line, the inclined surface 50A31 has an inclination angle of 40 to 60 degrees, for example, with respect to the bottom surface 50G of the groove portion. The other three inclined surfaces also have the same configuration.

Subsequently, a constitution of the peripheral side surface 70S will be described in detail. The peripheral side surface 70S is a surface connected to the first end surface 40S and the second end surface 50S and has a surface directed to a direction perpendicular to the center axis AX direction. In the peripheral side surface 70S, the surface directed to the second direction DR2 upward of the first cutting portion 20A has a rake face 20A2 (FIG. 2A) with respect to the first cutting edge 20A1, and the surface directed to the first direction DR1 front is a surface having a flank 20A3 with respect to the first cutting edge 20A1. Note that, on the first cutting portion 20A, two lateral cutting edges, that is, a lateral cutting edge 20A4 and a lateral cutting edge 20A5 are provided other than a front cutting edge.

The second cutting portion 20B is formed 180-degree rotational-symmetrically to the first cutting portion 20A with the center axis AX as a reference. Thus, in the peripheral side surface 70S, the surface directed to the second direction DR2 downward of the second cutting portion 20B is a surface having a rake face 20B2 with respect to the second cutting edge 20B1, and the surface directed to the first direction DR1 rear is a surface having a flank 20B3 with respect to the second cutting edge 20B1. Note that, on the second cutting portion 20B, two lateral cutting edges, that is, a lateral cutting edge 20B4 and a lateral cutting edge 20B5 are provided other than a front cutting edge.

As shown in FIG. 2B, the surface in the second direction DR2 upward of the peripheral side surface 70S slightly protrudes to the second direction DR2 upward on the first direction DR1 front end portion and the first direction DR1 rear end portion of the clamp portion 30, respectively. Similarly, the surface in the second direction DR2 downward of the peripheral side surface 70S slightly protrudes to the second direction DR2 downward on the first direction DR1 front end portion and the first direction DR1 rear end portion of the clamp portion 30, respectively. These four protruding portions are called an extension portion 70A1, an extension portion 70B1, an extension portion 70A2, and an extension portion 70B2. A top surface 70A1S (one example of the "second contact surface"), a top surface 70B1S (one example of the "second contact surface"), a top surface 70A2S (one example of the "second contact surface"), and a top surface 70B2S (one example of the "second contact surface") of each of the extension portions are substantially in parallel with the center axis AX, respectively. In this embodiment, each of these top surfaces is provided by extending in the center axis AX direction so as to be connected to the first end surface 40S and the second end surface 50S. Moreover, a dent (lightening portion) is provided in an interval between the extension portion 70A1 (extension portion 70A2) and the extension portion 70B1 (extension portion B2). Each of these top surfaces corresponds to a position which is separated the most from the second virtual plane IP2 in the second direction DR2 in the surfaces of the clamp portion 30. Therefore, these top surfaces can be used as contact surfaces capable of contacting the holder.

As shown in FIG. 2C, when the cutting insert 10 is divided into four regions by the first virtual plane IP1 and the second virtual plane IP2, and assuming that a region on a distal end side where the first cutting edge 20A1 is present in the first direction DR1 and on an upper end side where the first cutting edge 20A1 is present in the second direction DR2 is a first region (a lower left region in FIG. 2C), a region on the distal end side where the first cutting edge 20A1 is present in the first direction DR1 and on a lower end side where the first cutting edge 20A1 is not present in the second direction DR2 is a second region (an upper left region in FIG. 2C), a region on a base end side where the first cutting edge 20A1 is not present in the first direction DR1 and on the lower end side where the first cutting edge 20A1 is not present in the second direction DR2 is a third region (an upper right region in FIG. 2C), and a region on the base end side where the first cutting edge 20A1 is not present in the first direction DR1 and on the upper end side where the first cutting edge 20A1 is present in the second direction DR2 is a fourth region (a lower right region in FIG. 2C), the top surface 70A1S and the inclined surface 50A31 are present in the first region, the top surface 70A2S and the inclined surface 50A32 are present in the second region, the top surface 70B2S and the inclined surface 50B31 are present in the third region, and the top surface 70B1S and the inclined surface 50B32 are present in the fourth region and also, each of the inclined surfaces is provided at a position closer to the center axis AX than each of the corresponding top surfaces.

As described above, the cutting insert 10 includes the two first contact surfaces (the reference surface 50A1 and the reference surface 50B1), the four second contact surfaces (the top surfaces 70A1S to 70B2S), and the four third contact surfaces (the inclined surfaces 50A31 to 50B32). As will be described below, the cutting insert 10 can be held by a plurality of types of holders by using different combinations of these contact surfaces.

Figure 4A:
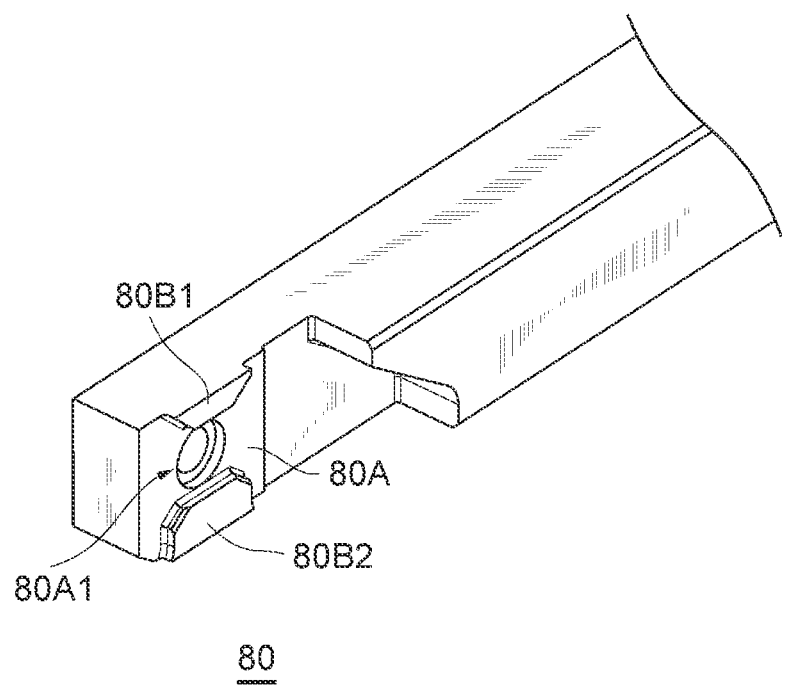
FIGS. 4A and 4B are enlarged perspective views of a cutting tool according to the embodiment.
Figure 4B:
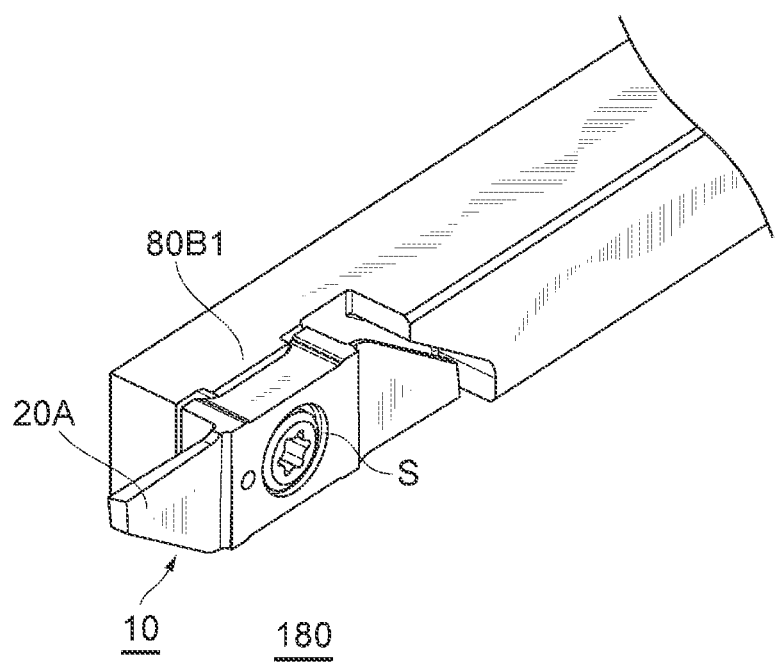

FIG. 4A is a perspective view of a first holder 80 which can hold the cutting insert 10, and FIG. 4B is an enlarged perspective view of a first cutting tool 180 including the cutting insert 10 and the first holder 80 which holds this.

As shown in the same figure, the first holder 80 has only such a thickness equal to or slightly larger than a length of the cutting insert 10 in the second direction DR2.

The first holder 80 has a seat surface 80A to contact the reference surface 50A1 and the reference surface 50B1, a female thread 80A1 formed on the seat surface 80A, and two wall portions, that is, a wall portion 80B1 and a wall portion 80B2 protruding in a direction perpendicular to the seat surface 80A. The wall portion 80B1 and the wall portion 80B2 are provided away from each other with the female thread 80A1 between them.

The wall portion 80B1 and the wall portion 80B2 are provided by protruding from the seat surface 80A in a direction corresponding to the center axis AX direction outward when they hold the cutting insert 10. The wall portion 80B1 (wall portion 80B2) has a wall surface which enters into the groove portion when it holds the cutting insert 10 and contacts or gets closer and is opposed to the inclined surface 50A31 (inclined surface 50A32) and a wall surface which contacts or gets closer and is opposed to the inclined surface 50B31 (inclined surface 50B32). In order to contact or get closer to and to be opposed to a desired position, the wall portion 80B1 (wall portion 80B2) may be provided so that a surface of a corner part provided on the wall portion 80B1 (wall portion 80B2) contacts or gets closer to and is opposed to the inclined surface 50A31 (inclined surface 50A32) and the inclined surface 50B31 (inclined surface 50B32), respectively.

By having the constitution as above, when the first holder 80 holds the cutting insert 10 for machining, it can be so constituted that at least three third contact surfaces in the four third contact surfaces (inclined surfaces 50A31 to 50B32) or the inclined surface 50B31, the inclined surface 50A32, and the inclined surface 50B32, for example, are supported by the first holder 80.

In the case of cutting by using the first cutting edge 20A1 of the cutting insert 10 as above, a male screw S is inserted into the through hole 10H from the first end surface 40S, is screwed with the female thread 80A1 of the first holder 80, and the male screw S is tightened. As a result, a head part of the male screw S presses an enlarged diameter part (part formed annularly) provided on an inner wall of the through hole 10H, and the reference surface 50A1 and the reference surface 50B1 of the second end surface 50S are pressed against the seat surface 80A. A force that the cutting insert 10 receives toward the center axis AX direction inward by means of the male screw S and a force that the reference surface 50A1 and the reference surface 50B1 receive toward the center axis AX direction outward as a reaction thereof are main tightening components for holding the cutting insert 10. The cutting insert 10 according to this embodiment is further constituted capable of suppressing rotation of the cutting insert 10 particularly around the center axis AX by using at least the three inclined surfaces, that is, the inclined surface 50A32, the inclined surface 50B32, and the inclined surface 50B31 as restricting surfaces.

In order to bring the inclined surface 50A32 and the inclined surface 50B32 into contact with the wall portion 80B2 suitably, misalignment (screw drawn amount) may be generated between a threaded hole axis of the female thread 80A1 and a screw axis of the male screw S.

Moreover, in order to bring the inclined surface 50B31 and the wall portion 80B1 into contact suitably, the male screw S (and the female thread 80A1 screwed with this) may be left-handed threads. By having the left-handed threads, a friction force generated between the male screw S and the female thread 80A1 acts in the direction for bringing the inclined surface 50B31 into contact with the wall portion 80B1 and thus, the wall portion 80B1 can be suitably brought into contact with the inclined surface 50B31.

As a result, at least three inclined surfaces, that is, the inclined surface 50A32, the inclined surface 50B32, and the inclined surface 50B31 function as restricting surfaces constituted capable of restricting rotation of the cutting insert 10 around the center axis AX. That is, a force in a direction opposite to each of the normal lines acts on these inclined surfaces. Thus, since on the second end surface 50S of the cutting insert 10, a force not only in the direction toward the first end surface 40S (center axis AX direction outward) but also in a direction perpendicular to the center axis AX direction (in a longitudinal direction, for example, a force toward a direction separated from the first virtual plane IP1 (stress for pulling the cutting insert 10 in the longitudinal direction) is generated at least in the three inclined surfaces, that is, the inclined surface 50B32, the inclined surface 50A32, and the inclined surface 50B31, while in the shorter-side direction, a force toward a direction getting closer to the second virtual plane IP2 (stress for compressing the cutting insert 10 in the shorter-side direction) is generated at least in the three inclined surfaces, that is, the inclined surface 50B32, the inclined surface 50A32, and the inclined surface 50B31), the cutting insert 10 can be held firmly even in the direction perpendicular to the center axis AX direction. Since the inclined surface 50B31 and the inclined surface 50A32 are provided, the rotation of the cutting insert 10 around the center axis AX by a rotational moment generated during lathe turning can be also suppressed. In addition, since the first holder 80 holds the cutting insert 10 without contacting the peripheral side surface 70S of the cutting insert 10, a thickness of the first holder 80 can be reduced and thus, the first cutting tool 180 with a small thickness can be provided. Moreover, by bringing the reference surface 50A1 and the reference surface 50B1 into contact with the seat surface 80A, blade-edge positional accuracy in the thickness direction (center axis AX direction) of the cutting insert 10 can be also improved.

Figure 5A:
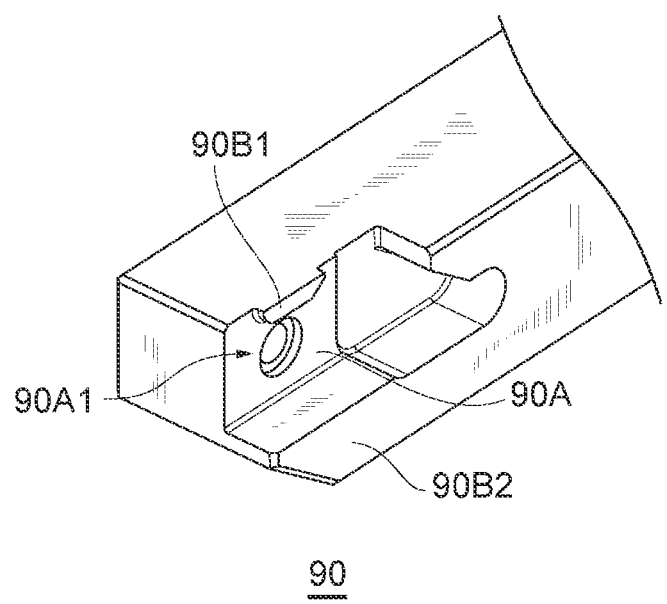
FIGS. 5A and 5B are enlarged perspective views of the cutting tool according to the embodiment.
Figure 5B:
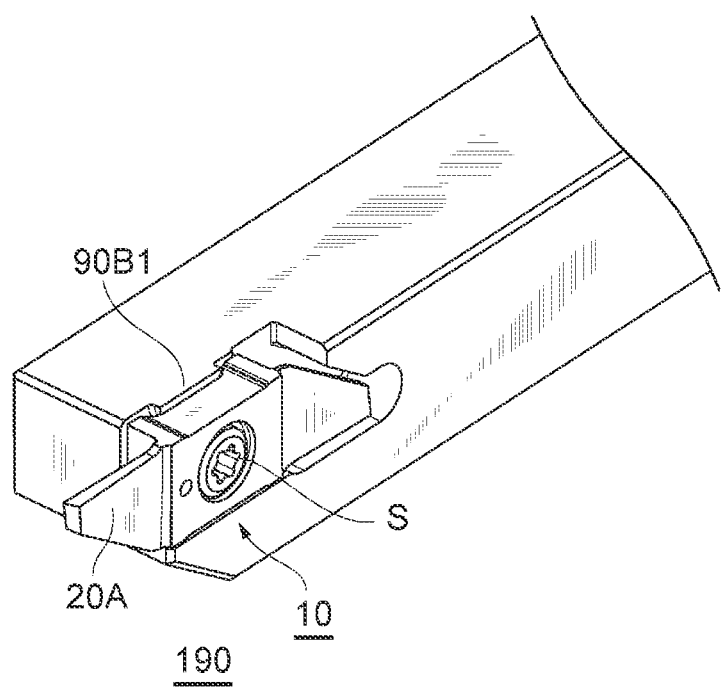

FIG. 5A is a perspective view of a second holder 90 which can hold the cutting insert 10, and FIG. 5B is an enlarged perspective view of a second cutting tool 190 including the cutting insert 10 and the second holder 90 which holds this.

As shown in the same figure, the second holder 90 has a thickness larger than a length of the cutting insert 10 in the second direction DR2.

The second holder 90 has a seat surface 90A to contact the reference surface 50A1 and the reference surface 50B1, a female thread 90A1 formed on the seat surface 90A, and two wall portions, that is, a wall portion 90B1 and a wall portion 90B2 protruding in a direction perpendicular to the seat surface 90A. The wall portion 90B1 and the wall portion 90B2 are provided away from each other with the female thread 90A1 between them.

The wall portion 90B1 and the wall portion 90B2 are provided by protruding from the seat surface 90A in a direction corresponding to the center axis AX direction outward when they hold the cutting insert 10. The wall portion 90B1 has a wall surface which enters into the groove portion when it holds the cutting insert 10 and contacts or gets closer and is opposed to the inclined surface 50A31 and a wall surface which contacts or gets closer and is opposed to the inclined surface 50B31. In order to contact or get closer to and to be opposed to a desired position, the wall portion 90B1 may be provided so that a surface of a corner part provided on the wall portion 90B1 contacts or gets closer to and is opposed to the inclined surface 50A31 and the inclined surface 50B31, respectively.

On the other hand, the wall portion 90B2 has a flush wall surface which contacts the top surface 70A2S of the extension portion 70A2 and the top surface 70B2S of the extension portion 70B2 without entering into the groove portion of the cutting insert 10 when it holds the cutting insert 10. Note that a dent (lightening portion) is provided in an interval between the extension portion 70A2 and the extension portion 70B2 and thus, this interval portion does not contact the wall surface of the wall portion 90B2.

In the case of cutting by using the first cutting edge 20A1 of the cutting insert 10 as above, the male screw S is inserted into the through hole 10H from the first end surface 40S, is screwed with the female thread 90A1 of the second holder 90, and the male screw S is tightened. As a result, the head part of the male screw S presses the enlarged diameter part (part formed annularly) provided on the inner wall of the through hole 10H, and the reference surface 50A1 and the reference surface 50B1 of the second end surface 50S are pressed against the seat surface 90A. At this time, the wall surface of the wall portion 90B1 is brought into contact at least with the inclined surface 50B31. On the inclined surface 50B31, a force in a direction opposite to the normal line acts. Thus, since the force toward the direction toward the first end surface 40S (center axis AX direction outward) acts on the second end surface 50S of the cutting insert 10, a strong stress is generated between that and the head part of the male screw S. Moreover, in the longitudinal direction, a force toward a direction separated from the first virtual plane IP1 (stress for pulling the cutting insert 10 in the longitudinal direction) is generated, while in the shorter-side direction, a force toward the direction getting closer to the second virtual plane IP2 (stress for compressing the cutting insert 10 in the shorter-side direction) is generated. By means of the force generated in the shorter-side direction, the top surface 70A2S of the extension portion 70A2 and the top surface 70B2S of the extension portion 70B2 are pressed against the wall surface of the wall portion 90B2. Therefore, the cutting insert 10 can be firmly held by the second holder 90. Particularly, since the inclined surface 50B31 is provided, the rotation of the cutting insert 10 around the center axis AX by the rotational moment generated during lathe turning can be suppressed. Moreover, by bringing the reference surface 50A1 and the reference surface 50B1 into contact with the seat surface 90A, the blade-edge positional accuracy in the thickness direction (center axis AX direction) of the cutting insert 10 can be also improved.

As described above, the cutting insert 10 can be held by the two types of holders, that is, the first holder 80 and the second holder 90. Therefore, if there is allowance in a space in the second direction DR2 of the cutting insert 10, machining can be performed by having the cutting insert 10 held by the second holder 90. At this time, since a holder thickness can be ensured, the cutting insert 10 can be firmly clamped by the second holder 90. On the other hand, if there is no allowance in the space in the second direction DR2 of the cutting insert 10, machining can be performed by having the cutting insert 10 held by the first holder 80.

Here, by means of integral molding in a state of a green compact, the four inclined surfaces 50A31 to 50B32 and the top surfaces 70A1S to 70B2S of the extension portions 70A1 to 70B2 of the cutting insert 10 may be formed at the same time. By manufacturing the cutting insert 10 as above, accuracy of a relative positional relationship between the inclined surface and the extension portion can be improved. Therefore, as compared with the case where the top surfaces 70A1S to 70B2S are formed by cutting, for example, relevance between a fluctuation amount in height of a blade edge position with respect to the top surfaces 70A1S to 70B2S and a fluctuation amount in height of the blade edge position with respect to the inclined surfaces 50A31 to 50B32 can be improved. Therefore, the cutting-edge positional accuracy in the second direction DR2 when the cutting insert 10 is held by the first holder 80 and the second holder 90 can be maintained at a certain level. Particularly, by providing the lightening portion between the top surfaces, the positional accuracy can be further improved.

Moreover, the present invention can be modified in various ways as long as the gist thereof is not departed. For example, the present invention may be applied to a cutting insert of a different type having a clamp portion at a center part in the first direction DR1 and a cutting blade at two positions which are diagonal with respect to the center axis AX. Other than the above, a part of constituent elements in one embodiment may be replaced with known other constituent elements or removed within a range of ordinary creativity of those skilled in the art. REFERENCE SIGNS LIST 10 Cutting insert
   10H Through hole
   20A First cutting portion
   20B Second cutting portion
   30 Clamp portion
   40 First end portion
   40S First end surface
   50 Second end portion
   50A Protruding portion
   50A1 Reference surface
   50A31 Inclined surface 50A32 Inclined surface
50B Protruding portion
50B1 Reference surface
50B31 Inclined surface
50B32 Inclined surface
50G Bottom surface
50S Second end surface
70A1 Standing portion
70A2 Standing portion
70B1 Standing portion
70B2 Standing portion
80 First holder
90 Second holder
180 First cutting tool
190 Second cutting tool

What is claimed is:

1. A cutting insert, comprising:
a first end surface;
a second end surface;
a peripheral side surface connected to the first end surface and the second end surface and having a rake face, a flank, and a cutting edge formed in a connection region between the rake face and the flank,
a through hole penetrating the first end surface and the second end surface;
a first contact surface substantially perpendicular to a center axis direction of the through hole and configured to contact a holder;
second contact surfaces substantially in parallel with the center axis direction of the through hole and substantially perpendicular to a plane including the first contact surface and configured to contact the holder;
third contact surfaces inclined with respect to the center axis direction of the through hole and configured to contact the holder;
a first end portion disposed at one end of the through hole in the center axis direction, the first end portion including the first end surface; and
a second end portion disposed at an opposing end of the through hole to the one end of the through hole in the center axis direction, the second end portion including the second end surface, wherein
the second end portion includes a first protruding portion protruding away from the first end surface;
a first one of the third contact surfaces is disposed on an inclined surface of the first protruding portion;
the second end portion includes a second protruding portion;
the first one of the third contact surfaces is disposed on the inclined surface of the first protruding portion;
a second one of the third contact surfaces is disposed on the inclined surface of the second protruding portion;
the first protruding portion and the second protruding portion are symmetrical with respect to a second virtual plane passing through the center axis of the through hole and orthogonal to a second direction corresponding to a shorter-side direction of the cutting insert, respectively, such that the first one of the third contact surfaces and the second one of the third contact surfaces are opposed to each other;
the cutting insert further comprising a peripheral side surface portion connected to the first end portion and the second end portion and on which the peripheral side surface, wherein
the peripheral side surface portion includes at least two extension portions protruding away from the second virtual plane,
the peripheral side surface includes at least two of the second contact surfaces,
a first one of the second contact surfaces is disposed on the surface of one of the extension portions, and
a second one of the second contact surfaces is disposed on the surface of another one of the extension portions.

2. The cutting insert according to claim 1, wherein
the first one of the third contact surfaces and the second one of the third contact surfaces are formed symmetrically with respect to a first virtual plane passing through the center axis of the through hole and orthogonal to a first direction corresponding to a longitudinal direction of the cutting insert.

3. The cutting insert according to claim 2, wherein
the first one of the third contact surfaces is formed so that a distance from the first virtual plane becomes larger as advancing in a direction separated from the center axis in the second direction, and
the second one of the third contact surfaces is formed so that the distance from the first virtual plane becomes larger as advancing in the direction separated from the center axis in the second direction.

4. The cutting insert according to claim 1, wherein
the cutting edge is formed on a distal end portion in a first direction which is a longitudinal direction of the cutting insert,
the first one of the second contact surfaces is formed in a region on a distal end side where the cutting edge is present with the center axis as a boundary in the first direction,
the second one of the second contact surfaces is formed in a region on a base end side remote from the cutting edge with the center axis as a boundary in the first direction,
the first one of the third contact surfaces is formed on a region on the base end side and a region on an upper end side where the cutting edge is present with the center axis as a reference in the second direction;
the second one of the third contact surfaces is formed in the region on the base end side and a region on a lower end side remote from the cutting edge,
a third one of the third contact surfaces is formed in the region on the distal end side and a region on the lower end side, and
a fourth one of the third contact surfaces is formed in the region on the distal end side and a region on the upper end side.

5. A cutting tool comprising:
a cutting insert according to claim 4; and
a holder for holding this cutting insert, wherein
the holder includes:
a seat surface in contact with the first contact surface of the cutting insert; and
a wall surface in contact with the first one of the second contact surfaces, the second one of the second contact surfaces and the first one of the third contact surfaces of the cutting insert, respectively.

6. A cutting tool comprising:
the cutting insert according to claim 4; and
a holder for holding the cutting insert, wherein
the holder includes:
a seat surface in contact with the first contact surface of the cutting insert; and
a wall surface in contact with the first one of the third contact surfaces, the second one of the third contact surfaces, and the third one of the third contact surfaces of the cutting insert, respectively.

7. The cutting insert according to claim 1, wherein
the cutting insert is formed 180-degree rotational-symmetrically with the center axis of the through hole as a reference.

8. A cutting insert, comprising:
a first end surface;
a second end surface;
a peripheral side surface connected to the first end surface and the second end surface and having a rake face, a flank, and a cutting edge formed in a connection region between the rake face and the flank,
a through hole penetrating the first end surface and the second end surface;
a first contact surface substantially perpendicular to a center axis direction of the through hole and configured to contact a holder;
second contact surfaces substantially in parallel with the center axis direction of the through hole and substantially perpendicular to a plane including the first contact surface and configured to contact the holder;
third contact surfaces inclined with respect to the center axis direction of the through hole and configured to contact the holder;
a first end portion disposed at one end of the through hole in the center axis direction, the first end portion including the first end surface; and
a second end portion disposed at an opposing end of the through hole to the one end of the through hole in the center axis direction, the second end portion including the second end surface, wherein
the second end portion includes a first protruding portion protruding away from the first end surface;
a first one of the third contact surfaces is provided on an inclined surface of the first protruding portion;
the second end portion includes a second protruding portion;
the first one of the third contact surfaces is disposed on the inclined surface of the first protruding portion;
a second one of the third contact surfaces is disposed on the inclined surface of the second protruding portion;
the cutting insert further comprising a peripheral side surface portion connected to the first end portion and the second end portion and on which the peripheral side surface, wherein
the peripheral side surface portion includes at least two extension portions protruding away from a second virtual plane passing through the center axis of the through hole and orthogonal to a second direction corresponding to a shorter-side direction of the cutting insert,
the peripheral side surface includes at least two of the second contact surfaces,
a first one of the second contact surfaces is provided on the surface of one of the extension portions, and
a second one of the second contact surfaces is provided on the surface of another one of the extension portions.

* * * * *